United States Patent Office 2,951,174
Patented Aug. 30, 1960

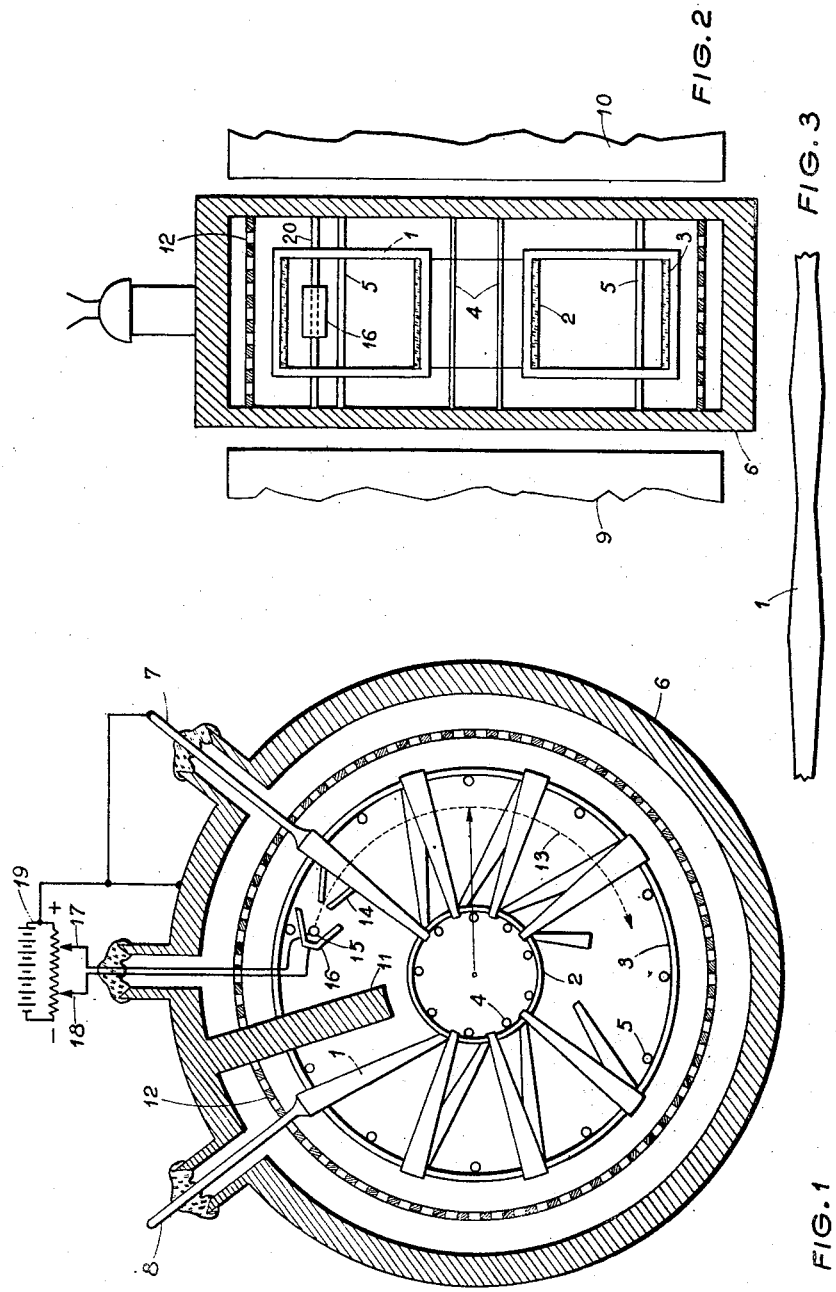

2,951,174

TRAVELLING WAVE TUBES

Georges Mourier, Jamaica, N.Y., and Oscar Döhler, Paris, France, assignors to Compagnie Generale de Telegraphie Sans Fil, Paris, France Filed Mar. 24, 1958, Ser. No. 727,513

Claims priority, application France Nov. 25, 1947

20 Claims. (Cl. 315—3.5)

This application is a continuation-in-part application of our copending application Serial No. 444,558, filed July 20, 1954, now abandoned, which in turn is a continuation-in-part application of our application Serial No. 59,364, filed November 10, 1948, now abandoned, the present application only disclosing and claiming the subject matter of our aforementioned application Serial No. 59,364.

The present application relates to a new type of traveling wave tube, more particularly suitable for amplifying or producing ultra-high-frequency waves.

The tube according to the present invention comprises, within an evacuated envelope, an interaction space free of electric field and limited by a circularly bent structure, made of a conductive material and comprising an ultra-high-frequency delay line, the structure being brought to a predetermined potential. Within this space is applied, in the axial direction of the structure, a uniform, time-constant magnetic field, while an electron beam in injected in this space in a plan perpendicular to this direction, the velocity of the beam, which is perpendicular to this axis, and expressed in volts, being equal to the potential of the structure concerned; thus the beam describes under the action of the magnetic field a circular trajectory about the line axis. Electromagnetic energy is caused to propagate along the delay line with an angular phase velocity equal to the angular velocity of the velocity of the beam. This results in the amplification of the ultra-high-frequency energy and, under certain conditions, in the generation of oscillations.

Certain prior art devices are known which may superficially resemble the present application which, however, are clearly distinguishable therefrom on the following grounds.

United States Patent 2,652,270 to R. Kompfner relates to rectilinear wave travelling tubes in which a beam propagates in an equipotential space, inside a rectilinear helix, interacting with the wave which propagates in the helix. The tube according to the present invention differs from the tube covered by this Kompfner patent by the following features:

(a) The presence of the magnetic field, perpendicular to the plane of initial velocity of the beam;

(b) The circular trajectory of the beam, as a result of this field; and (c) The general curved or circular structure of the tube.

It has the advantage that it occupies less space than the rectilinear structures affording comparable performance. In addition, its electronic amplifying mechanism is totally different and definitely more advantageous as regards efficiency.

United States Patent 2,511,407 to W. Kleen et al. relates to another type of tube comprising two coaxial circular electrodes between which is applied a constant, radial electric field and a magnetic field parallel to the common axis of the electrodes, across the space between these electrodes which space, however, is not equipotential. A beam fed into this space describes a circular trajectory under the action of two transverse forces, one of which is the electric force due to the radial electric field, the other being the Lorentz force due to the magnetic field and the velocity of the electrons. An ultra-high-frequency wave travelling along the delay line constituted by one of the circular electrodes interacts with the beam, being amplified if the respective phase and beam velocities are equal.

The tube according to the invention differs from this type of tube in that the space in which the beam propagates is free of any electric field, and that the beam velocity, expressed in volts, is equal to the potential of the structure limiting that space. The beam describes a circular trajectory under the action of two transverse forces, one of which is the Lorentz force as in the former tube, the other, however, being the centrifugal force. Thus, the electrons are subjected to the same forces as in a cyclotron, although the exchange of energy takes place in the opposite direction. For this reason, the tube may be termed an "anti-cyclotron." It has the advantage that, assuming similar performances, it can be built with magnetic field much weaker and potentials lower than in the previous tube, which facilitates the arrangement of supplying sources. Recalling that it has been calculated hereinbefore that, under a set of predetermined conditions, the tube according to the application operates under $V=625$ v. and $B=28$ gauss, it should be indicated by way of comparison that, for a tube according to United States Patent 2,511,407, assuming the same values of $v$ and $r$, it is necessary to supply, respectively, 2,500 v. and 550 gauss.

The foregoing and other objects of this invention will be best understood from the following description of several embodiments thereof, shown for purposes of illustration only, reference being made to the accompanying drawings wherein:

Figure 1 shows a cross section of a first embodiment of the invention, used as an amplifier;

Figure 2 shows a longitudinal view of the embodiment of Figure 1;

Figure 3 illustrates the shape of the helical conductor of Figure 1;

Figure 4:
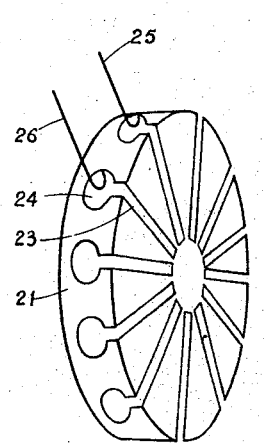
Figure 4 shows in perspective a second embodiment of the present invention also used as an amplifier.

The tube shown in Figures 1 to 3 is designed for operation as an amplifier; the space, free of electric field, in which the beam propagates, is included in a helix 1. This helix is wound circularly over two coaxial insulating rings 2 and 3 which are supported respectively by cross rods 4 and 5 fastened to the upper and lower covering plates of the vacuum tight cylindrical envelope 6. The input and output ends of the helix are connected respectively to the ultra-high-frequency conductors 7 and 8, which are respectively the input and output for the ultra-high-frequency energy. The envelope 6 is placed in a magnetic field directed along its axis of symmetry and supplied by pole pieces 9 and 10. The helix is wound as a flat tape; Figure 3 shows one of its turn unrolled; the turns are of rectangular cross section, the small side of the rectangle being oriented in the direction of the lines of force of the magnetic field as best seen in Figure 2. Between input 7 and output 8 is placed an uncoupling screen 11 connected to the envelope 6, the helix assembly being surrounded by a grid 12 also connected to the envelope 6. An electron gun is placed ahead of the helix input; according to the present invention, this gun is located in the vicinity of the helix periphery, as shown in Figure 1, so that the beam 13 of electrons indicated in Figure 1 by the dashed line travels nearer to this periphery than to the center of the helix. This gun consists of an anode 14 connected to the helix 1 and hence brought to the potential of the latter, of a cathode 15 and of a Wehnelt electrode 16; the two latter electrodes 15 and 16 are carried by an insulating rod 20 and brought to suitable negative potentials with respect to the anode, by means of conductors 17 and 18 connected to appropriate tops of the D.C. power supply or source 19; the positive pole of the latter is connected to the envelope 6 and to the helix 1 by means of conductor 7.

*Operation.*—The arrangement of the embodiment of Figures 1 through 3 operates as follows:

Let B be the induction of the magnetic field prevailing in the tube due to pieces 9 and 10 and V the potential difference between the helix 1 and cathode 15. The electron beam, accelerated by the potential V of the anode 14, enters the helix with a velocity $$v_{cm./sec.} = 6.10^7 \sqrt{V} \text{ volts} \quad (1)$$

Conventionally, this velocity $v$ shall hereinafter be expressed by the potential V (volts).

In accordance with Larmor's law, this beam describes a circle in the space free of the electric field inside the helix, with an angular velocity:

$$\omega = \frac{e}{m} \cdot B \quad (2)$$

where $e$ and $m$ are respectively the charge and the mass of an electron.

If the beam is to describe a circular trajectory centered on the tube axis and of a given radius $r$, the angular velocity $$\frac{v}{r}$$

must be equal to $\omega$, and hence, V and B must be connected by the equation:

$$\frac{6.10^7 \sqrt{V}}{r} = \frac{e}{m} B \quad (3)$$

There will arise an interaction between the electron beam and the ultra-high-frequency energy fed through the input 7 and propagating within the helix 1, if the angular phase velocity of the energy, determined by the delaying properties of the helix 1, is equal to $\omega$.

Applicants have established that, if the electron beam is to yield energy to the alternating electromagnetic field, it is necessary that the electron gun be disposed substantially nearer to the outer periphery of the helix than to its central part. This is why the gun 14, 15, 16 has been placed next to the ring 3, as indicated in Figure 1.

The grid 12, which is made, for instance, of molybdenum, is for stopping those electrons which, travelling towards the outer part of the helix 1, might run out of the latter.

The fact that the helix 1 is of flat cross section, with the small axis of the cross section thereof pointing in the direction of the magnetic field, makes it possible to reduce the magnitude of the radial component of the ultra-high-frequency field inside the helix; this component is detrimental since it results in imparting energy to the electrons taken off the ultra-high-frequency filed, which in turn results in a decrease in the efficiency.

Assuming the velocity $v$ of the electrons to be 1/20 of the velocity of the light ($V=625$ volts) and assuming further that $r=3$ cm., it may be calculated from Formulae 1, 2 and 3 that the value for the magnetic field must be $B=28$ gauss. It is seen from this example that the source 19 must supply a relatively low voltage and, furthermore, that the magnet 9, 10 may be a permanent magnet.

Figure 5:
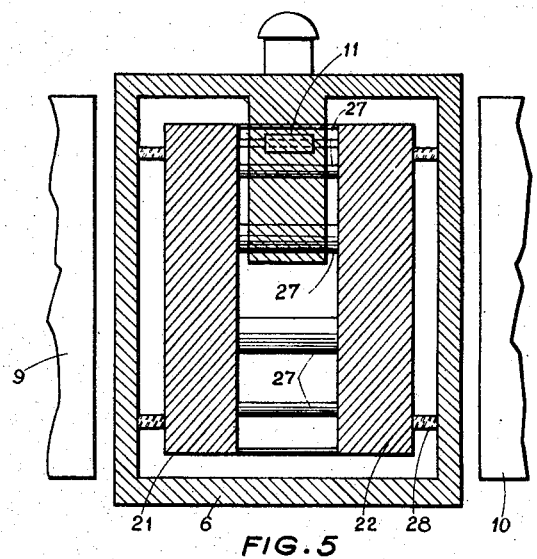
Figure 5 shows a longitudinal cross section of the embodiment according to Figure 4.
Figure 6:
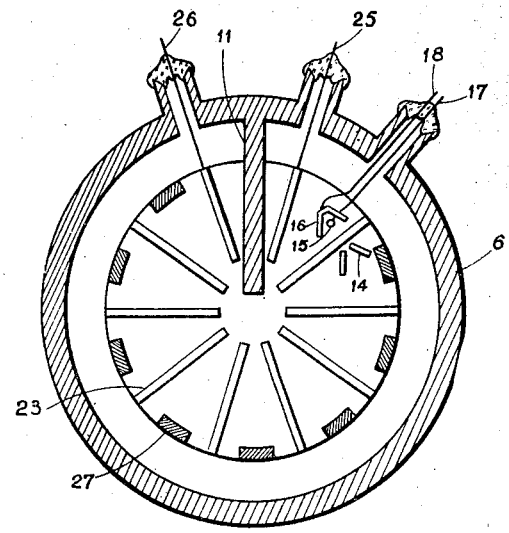
Figure 6 shows a transverse cross section of the embodiment according to Figure 4.

In the embodiment represented by Figures 4 to 6, the space free of electric field is included between two parallel identical disks 21 and 22; one of these disks is shown in perspective in Figure 4. Each disk 21 and 22, preferably of copper, displays a number of radial slots 23 which communicate with cavities 24, also radial. The assembly formed by these cavities 24 and slots 23 constitutes a delay line. In one of these cavities, an ultra-high-frequency electromagnetic wave is excited by means of the loop 25, the energy being collected at the output also be means of a loop 26. The two disks 21, 22 (Figure 5) are connected by cross arms 27 made of conducting metal plate, the latter both insuring the rigidity of the assembly and enabling the two disks to be brought to the same potential, so that the space between the disks is screened off from the action of any D.C. electric field.

In this space is disposed a gun 14, 15, 16 which is identical with that of Figure 1 and is likewise placed nearer to the periphery than to the center of the disks 21 and 22.

The disks 21 and 22 are clamped by rings 28 against the wall of the envelope 6 on which is also secured the collector 11, the latter extending both between the disks 21 and 22 and between the input 25 and output 26. The tube structure, moreover, is the same as that of Figure 1, operation being analogous thereto.

Figure 7:
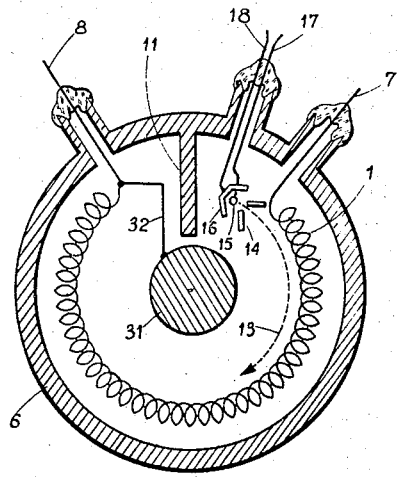
Figure 7 shows a cross section of a third embodiment of the invention, used as an amplifier.

In the embodiment schematically shown in Figure 7, the fieldless space in which the beam propagates is included between a delay line 1, on the one hand, shown again in the form, for example, of a helix though any other type, such as a vane-type delay line or one made of a sequence of cavities, may also be used, and a coaxial cylindrical electrode 31, on the other, arranged centrally in the tube. Through the connection 32, the line 1 is brought to the potential of the electrode 31. Connection 32 may alternatively be replaced by an equivalent exterior to the tube or by separately feeding the two electrodes 1 and 31. Unlike Figure 1, the beam 13 does not travel inside but outside the helix. The gun 14, 15, 16 is arranged nearer to the helix 1 than to the electrode 31. Furthermore, like references again denote like elements, and the tube of Figure 7 operates as in the case of Figure 1.

Figure 8:
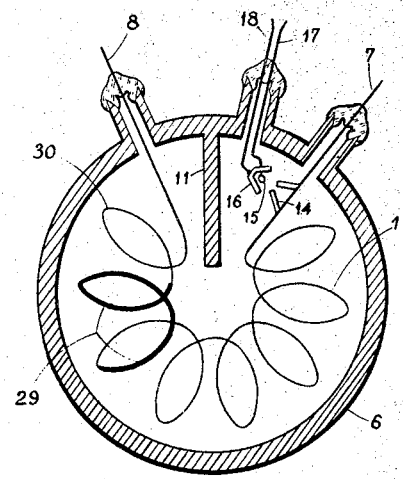
Figures 8 and 9 show cross sections of further embodiments of a tube similar to Figure 1.

Figure 8 represents a modification of the tube of Figure 1, but this modification can, of course, be applied to the other embodiments of the invention. At the extremity of the helix, the turns 29 are coated with a substance that fully absorbs the ultra-high-frequency wave; as a result thereof, there arises along the portion of space inside the turns 29 a drift space for the electrons of the beam 12. The outermost section 30 of the helix 1 is, therefore, coupled only electronically to the section of the helix preceding the attenuation 29; the outermost section 30 may, therefore, be regarded as a distinct output circuit connected to the output 8; it is integral with sections 1 and 29 only for constructive convenience.

Figure 9:
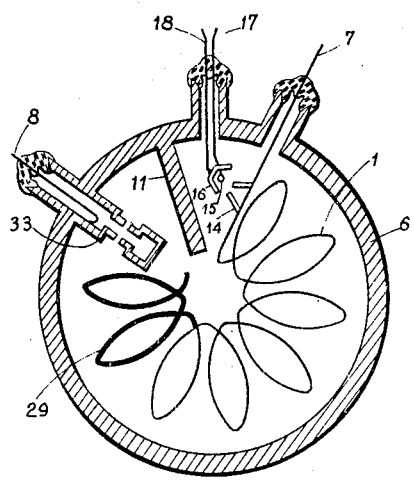

In Figure 9, the output circuit is a resonant cavity 33.

The invention is not limited to using the described tube as an amplifier; it may be used also as an oscillator. To achieve this, one simply has either to eliminate the collector 11 so that the electrons be re-fed to the input of the delay line, or to set up an outer feedback coupling between the output 8 and the input 7.

We claim:

1. An electron discharge tube comprising, in an evacuated envelope, a circularly curved conductive structure defining a curved electron and wave interaction duct having an output and including delay elements for ultra-high-frequency wave energy propagating in said duct, a terminal connection to said structure for applying a potential to establish an equipotential throughout said duct, an electron gun positioned to emit a beam of electrons into said duct in a plane perpendicular to the axis of curvature of said structure at a velocity having a resultant directed perpendicularly to said axis and a value expressed in volts substantially equal to said potential, means for establishing in said duct a uniform magnetic field having its lines of force directed parallel to said axis and of predetermined induction so as to impart to the electrons of said beam a circular motion around said axis, the delaying characteristics of said delay elements and the radius of curvature of said structure being such as to cause the angular velocity of phase propagation of said ultra-high-frequency wave energy in said duct to be substantially equal to the angular velocity of said electrons as determined by the magnitude of said induction, and means for collecting said wave energy at said output.

2. A tube as claimed in claim 1, wherein said structure comprises a circularly curved helix bounding said circular duct on all sides thereof.

3. A tube as claimed in claim 2, wherein said helix is of flattened cross section having a major axis and a minor axis, said minor axis being directed parallel to said lines of force.

4. A tube as claimed in claim 2, wherein said electron gun is positioned to emit said beam of electrons substantially closer to the external periphery than to the internal periphery of said duct.

5. A tube as claimed in claim 1, wherein said structure comprises two coaxial, spaced disk-shaped electrodes having opposed faces defining said circular duct therebetween and bounding two sides thereof, said delay elements comprising radial slots in said opposed faces.

6. A tube as claimed in claim 5, wherein said electron gun is positioned to emit said beam of electrons substantially closer to the external periphery than to the internal periphery of said duct.

7. A tube as claimed in claim 1, wherein said structure comprises a circular delay line bounding said circular duct on the outside and a circular electrode concentric with said delay line and bounding said duct on the inside, and further comprising an electrical connection for applying the same potential to said delay line and said electrode.

8. A tube as claimed in claim 7, wherein said electron gun is positioned to emit said beam of electrons substantially closer to said delay line than to said electrode.

9. A tube as claimed in claim 1, further comprising an input coupling to said structure, and decoupling means for ultra-high-frequency wave energy located between said output and said input coupling, said wave energy propagating from said input coupling toward said output in the same direction as said beam of electrons with an angular velocity of phase propagation in the same sense as said beam of electrons.

10. A tube as claimed in claim 1, further comprising means associated with said structure at a point thereof remote from said electron gun for attenuating ultra-high-frequency wave energy.

11. A tube as claimed in claim 1, wherein the magnitude of said induction is related to said potential by a square law for a predetermined radius of electron trajectory corresponding to said circular motion.

12. In an electronic device for amplifying ultra-high-frequency waves, means for producing an electron beam, means for producing a magnetic field acting upon said beam so as to bend its path in a plane substantially perpendicular to said magnetic field, a delay line disposed in said plane along a circular path substantially parallel to said beam path and including a helix having a series of mutually spaced flat spiral convolutions of rectangular cross section in which said beam is propagated, a circular conductive element concentric with and surrounding said helix along said beam path, each spiral convolution having an outer end portion and an inner end portion located along a radius of said circular conductive element, said beam producing means being located adjacent to the outer end portion of that one of said spiral convolutions forming the input of said delay line whereby said beam passes through said outer end portions of said spiral convolutions, said circular conductive element and said delay line being at a common direct current potential, terminal means for applying ultra-high-frequency energy to the input of said line adjacent to said beam producing means, and terminal means for taking off amplified ultra-high-frequency energy from the output of said line remote of said beam producing means.

13. An electron discharge tube comprising, in an evacuated envelope, first means constituting a curved conductive structure and defining a curved electron and wave interaction space including a plurality of delay elements for propagating ultra-high-frequency wave energy therealong, at least one coupling means enabling transfer of energy to or from said first means, second means operatively connected with said first means to establish an equipotential throughout said space, means for emitting a beam of electrons into said space in a plane essentially perpendicular to the axis of curvature thereof at a velocity having a resultant directed essentially perpendicular to said axis, means for establishing in said space a uniform magnetic field to impart to the electrons of said beam a motion about said axis, the angular velocity of phase propagation of said ultra-high-frequency wave in said first means being substantially equal to the angular velocity of said electrons as determined by the magnitude of said means establishing a uniform magnetic field.

14. An electron discharge tube according to claim 13, wherein said tube includes input and output coupling means to amplify a signal applied to said input coupling means connected with said first means and extract the amplified energy at the output coupling means thereof.

15. An electron discharge tube according to claim 13, further comprising means for producing oscillations in said tube.

16. An electron discharge tube according to claim 15, wherein said last-mentioned means includes a feedback circuit disposed between said coupling means consisting of an input and output coupling connected with said first means.

17. In an electronic discharge device of the traveling-wave-type tube provided with an essentially equipotential interaction space, the combination comprising wave guiding means forming a delay line structure having effectively two ends, said delay line structure being curved in a first plane and adapted to propagate therealong electromagnetic wave energy, cathode means in said system for emitting electrons adapted to propagate in said interaction space from one end to the other of said two ends along said wave guiding structure in coupled relationship therewith, energy transfer means operatively connected with said delay line structure to enable energy transfer between said delay line structure and an external load circuit, and means in said device for directing said electrons to propagate along said wave guiding means in coupled relationship therewith in curved paths extending in a direction from said one end to the other end thereof at such velocity as to enable interaction between said electrons and the electromagnetic wave energy propagating therealong including means for producing a magnetic field with the lines of force thereof extending in a second plane essentially perpendicular to said first plane and to the direction of propagation of said electrons and of such strength as to thereby bend said electrons into curved paths essentially parallel to the curvature of said delay line structure and establish equilibrium in said equipotential interaction space between the centrifugal force of the electrons in said curved paths and the magnetic force of said magnetic field producing means.

18. In an electronic discharge device of the traveling-wave-type tube provided with an essentially equipotential interaction space, the combination comprising a delay line structure having effectively two ends, said delay line structure being curved in a first plane and adapted to propagate therealong electromagnetic wave energy, energy transfer means operatively connected with said delay line structure to enable energy transfer between said delay line structure and an external load circuit, and means in said device for propagating electrons along paths in said equipotential interaction space adjacent said wave guiding means in coupled relationship therewith to enable energy-transfer interaction between said electrons and the electromagnetic wave energy propagating therealong including cathode means within said device for emitting said electrons adapted to propagate in the direction from the first end toward the second end along said delay line structure in coupled relationship therewith, means for producing a magnetic field with the lines of force thereof extending in a second plane essentially perpendicular to said first plane and to the direction of said electron paths to thereby bend said electrons into curved paths essentially following the curvature of said delay line structure, and means for directing said electrons to propagate along said delay line structure at a velocity to establish equilibrium in said equipotential interaction space between the centrifugal force of the electrons in said paths and the magnetic force of said magnetic field producing means to thereby enable a transfer of energy between said traveling wave and said electrons.

19. An electron discharge device provided with an equipotential interaction space, comprising a delay line having a geometrically periodical structure curved in a plane and effectively provided with two ends, electron emissive means adapted to emit electrons for propagation in said equipotential interaction space in coupled relationship with said delay line, means effectively uncoupling said two ends, means for directing the flow of electrons along paths adjacent to said delay line structure and at a velocity substantially equal to the phase velocity of the electromagnetic wave energy propagating along said line, means operatively connected to said delay line structure for enabling transfer of electromagnetic energy to or from said delay line structure, and means for curving the paths of the electron flow to follow the curvature of said delay line structure including means for producing an essentially uniform magnetic field having its lines of force directed essentially perpendicular to said curvature plane and of such strength that by acting on said electrons equilibrium exists in said equipotential interaction space between the centrifugal force of the electrons and the magnetic force of said magnetic field producing means.

20. In an electronic device for amplifying ultra-high-frequency waves and provided with an essentially equipotential interaction space, the combination comprising means for producing an electron beam, means for producing a magnetic field acting upon said beam so as to bend its path in a plane substantially perpendicular to said magnetic field, a delay line disposed in said plane along a curved path substantially parallel to the path of said beam, said beam producing means being located near the outer portion of said delay line, input means operatively connected with said delay line and adapted to apply ultra-high-frequency energy to the delay line, and output means operatively connected with said delay line and adapted for taking off amplified ultra-high-frequency energy from said delay line, said electron beam propagating in said equipotential interaction space and the strength of said magnetic field being such that equilibrium exists in said equipotential interaction space between the centrifugal force of the electrons and the magnetic force of said magnetic field producing means.

References Cited in the file of this patent

UNITED STATES PATENTS

| | | |
|---|---|---|
| 2,511,407 | Kleen et al. | June 13, 1950 |
| 2,566,087 | Lerbs | Aug. 28, 1951 |
| 2,582,185 | Willshaw | Jan. 8, 1952 |
| 2,768,328 | Pierce | Oct. 23, 1956 |